United States Patent [19]

Billings et al.

[11] 3,783,613
[45] Jan. 8, 1974

[54] VEHICULAR POWER PLANT

[75] Inventors: Roy O. Billings; Samuel R. Henderson, both of Milwaukee, Wis.

[73] Assignee: Kaye A. Meyer, New Berlin, Wis.; a part interest

[22] Filed: Mar. 29, 1972

[21] Appl. No.: 239,202

[52] U.S. Cl. ............................................ 60/38
[51] Int. Cl. ........................ F01k 25/00, F01k 25/02
[58] Field of Search .............................. 60/36, 38

[56] References Cited
UNITED STATES PATENTS

| 1,961,786 | 6/1934 | Roe | 60/38 |
| 1,961,788 | 6/1934 | Roe | 60/38 |
| 2,802,114 | 8/1957 | Artsay | 60/36 |

*Primary Examiner*—Martin P. Schwadron
*Assistant Examiner*—Allen M. Ostrager
*Attorney*—Arthur L. Morsell, Jr. et al.

[57] ABSTRACT

An expanded-vapor-driven device is driven by pressurized vapor from a generator, and a pressurized-liquid-driven device is driven by pressurized liquid from the same generator. The working fluid in the generator is preferably a mixture of two different fluids, one of which is more volatile than the other and which is soluble in the other. The vapor and liquid exhaust from the two devices is piped to an absorber unit where the vapor and liquid are cooled and remixed before being recycled back to the generator. The absorber is located in the air inlet path to the burner for the generator and preheats the primary and secondary air for the burner. The mixed fluid from the bottom of the absorber is pumped to a heat exchanger which is connected so as to be in a heat exchange relationship with the hot liquid that is moving from the bottom of the generator to the pressurized-liquid-driven device. This preheats the mixed fluid just before it is pumped into the generator.

5 Claims, 2 Drawing Figures

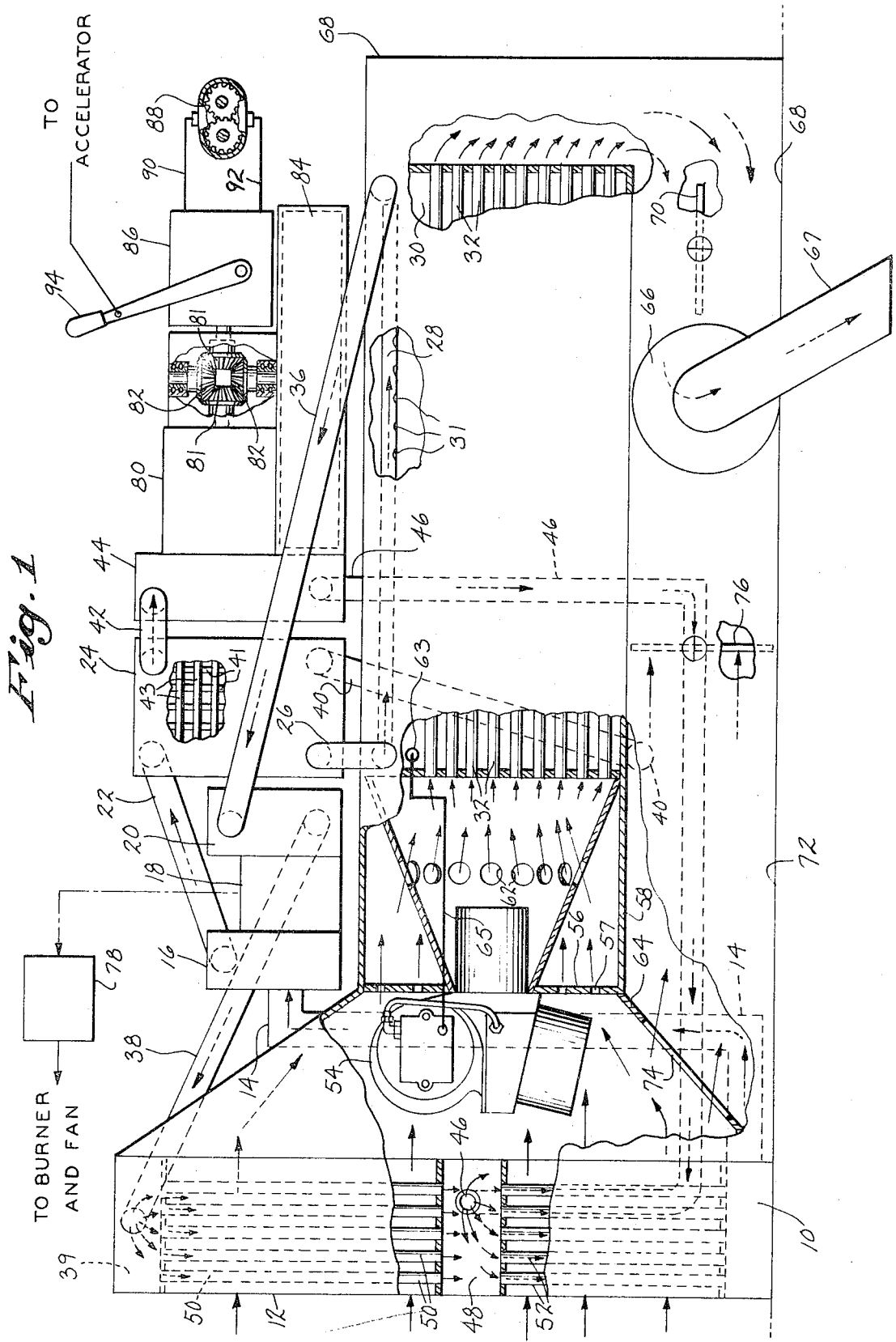

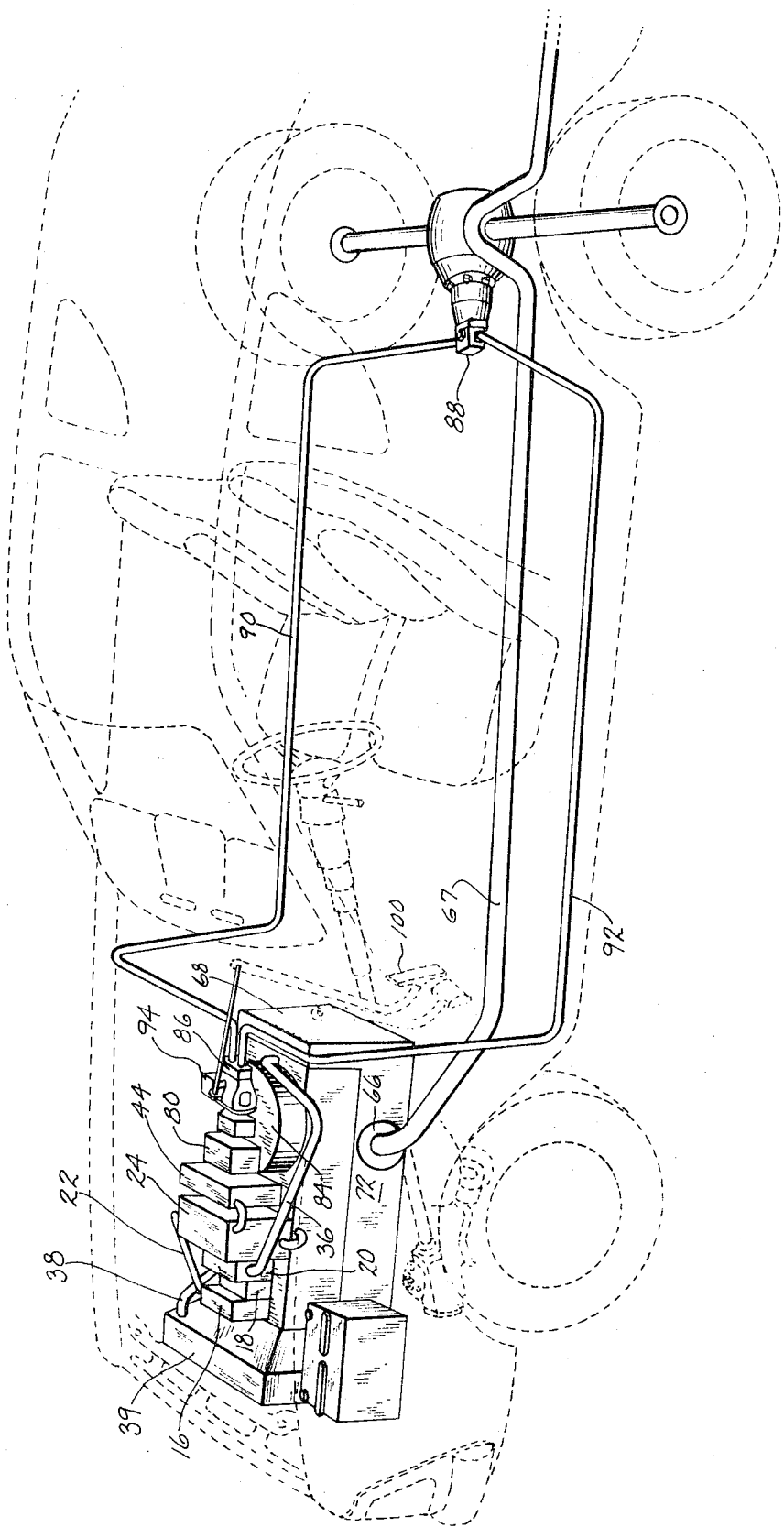

VEHICULAR POWER PLANT

BACKGROUND OF THE INVENTION

This invention relates in general to vehicular power plants and more particularly to vapor and/or liquid turbine engines that are adapted to be installed in vehicles to serve as the prime mover for the vehicle.

In the past, internal combustion engines of the reciprocating piston type have been used almost exclusively for vehicular power plants, even though such engines have many serious drawbacks, which include pollution of the atmosphere by incompletely oxidized exhaust gases, excessive noise, high weight-power ratios, necessity for relatively expensive high octane hydrocarbon fuels, engine cooling problems at low vehicle speed, the requirement for a complicated electrical ignition system, the requirement for a complicated transmission-clutch system, cyclical vibration and pulsating gas flow requiring shock and vibration supports as well as noise suppressing insulation and mufflers, complicated valve and valve operating systems, and relatively high initial cost and maintenance cost. Because of these drawbacks, much time and effort has been expended in the past to develop alternate vehicular power plants such as gas turbine engines and the like.

The gas turbine engine eliminates most of the above-noted drawbacks, but it introduces new drawbacks which include operation in a relatively high temperature environment which necessitates the use of exotic materials for some parts and presents problems in the dissipation of the high temperature exhaust gases, high starting torque requirements, slow acceleration characteristics because of the inherent lag in power demand to power delivery of high inertia rotary systems, high idling fuel consumption, and an annoying, high-pitched whine caused by vibration of turbine and compressor elements.

Accordingly, the principal object of this invention is to provide a vehicular power plant which avoids the above-noted drawbacks.

Another object of this invention is to provide a vehicular power plant of the above-noted type which utilizes an expanded-vapor-driven device and a pressurized-liquid-driven device which are simultaneously driven from a common generator, one of the two devices serving as a primary power source and the other serving as an auxiliary power source.

A further object of this invention is to provide a vehicular power plant of the above-noted type which, in a preferred embodiment, contains two fluids that are mixed together to form the working fluid for the power plant, one of the fluids being more volatile than the other and being soluble in the other.

An additional object of this invention it to provide a vehicular power plant in which waste heat is utilized to preheat the primary and secondary air for the burner that heats the generator and also to preheat the working fluid before it enters the generator.

Another object of this invention is to provide a vehicular power plant which is relatively compact in structure and reliable in operation.

SUMMARY OF THE INVENTION

In accordance with this invention, the above-noted objects are attained by providing a hydraulic-vapor engine in which a pressurized-liquid-driven device and an expanded-vapor-driven device are simultaneously driven from a common generator. In the preferred embodiment, the pressurized-liquid-driven device is a liquid turbine and the expanded-vapor-driven device is a vapor turbine. The working fluid in the generator is preferably a mixture of two different fluids, one of which is more volatile than the other and which is soluble in the other, e.g., ammonia and water, lithium chloride and water, freon and oil, or the like. The vapor and liquid exhaust from the two devices is piped to an absorber unit where the vapor and liquid are cooled and remixed before being recycled back to the generator. In the preferred embodiment, the absorber is located in the air inlet path to the burner for the generator and preheats the primary and secondary air for the burner. The mixed fluid is pumped from the bottom of the absorber to a heat exchanger which is connected to the input side of the liquid driven device so as to be in a heat exchange relationship with the hot liquid that is moving from the bottom of the generator to the liquid driven device. This preheats the mixed fluid just before it is returned to the generator.

BRIEF DESCRIPTION OF THE DRAWING

FIG. 1 is a partially cut away side elevational view of one illustrative embodiment of the invention; and FIG. 2 is a perspective view showing the embodiment of FIG. 1 mounted in an automobile.

DETAILED DESCRIPTION OF THE INVENTION

Although it is possible to utilize a single, homogeneous working fluid in the power plant of this invention, the preferred embodiment utilizes a mixture of two fluids, one of which is more volatile than the other and which is soluble in the other. Suitable combinations of fluids could be ammonia and water, methylene chloride and dimethylether tetraethylene glycol, ammonia and lithium nitrate, lithium chloride and water, and lithium bromide and water.

The purpose in using the mixed fluid is to provide a volatile portion which is easily vaporized and pressurized as a vapor in combination with an incompressible liquid portion which is suitable for driving a liquid turbine or other pressurized-liquid-driven devices. The different mixtures listed above produce varying physical properties which will be useful in different embodiments of the invention, depending upon the pressure and temperature considerations involved.

Referring to FIG. 1, the mixture of fluids is picked up in the bottom region 10 of an absorber unit 12, the latter functioning to cool, condense, and re-mix the two fluids after they have been used separately in the working cycle of this invention. The mixed fluid is drawn through a fluid conduit 14 by a pump 16 which is driven through reducing gears 18 by an expanded-vapor-driven device 20 which may be a gas turbine. The pump 16 draws the mixed fluid up through the conduit 14 and then forces the mixed fluid through a second conduit 22 into the upper inlet of a heat exchanger 24 where the incoming mixed fluid is preheated by entering into a heat exchanger relationship with a hot fluid travelling in the other direction through the heat exchanger, as will be later described in detail.

The preheated mixed fluid is discharged from the heat exchanger 24 through a short conduit 26 which is coupled to an atomizer conduit 28 within a generator 30. The fluid is sprayed from the atomizer conduit 28 into the interior of the generator 30 over the flue ducts 32. The atomizer conduit 28 is closed at its end and is provided with openings 31 along the length thereof so that the mixed fluid will spray out of the openings in a plurality of small jets. The interior of the generator 30 below the atomizer conduit 28 is filled with a plurality of flue ducts 32 through which hot air and heated gases from the burner 54 are driven to heat the walls of the flue ducts 32 and thus heat the mixture of fluids within the generator 30. The fluid which is discharged from the atomizer conduit 28 is sprayed upon the heated tubes forming the flue ducts 32 and thus receives heat, the latter vaporizing the volatile fluid portion of the mixture and pressurizing the vapor thereof. The less volatile fluid of the mixture stays in liquid form and falls to the bottom of the generator 30.

Two outlet conduits are provided from the generator 30, one of them being a vapor outlet conduit 36 which extends from the upper portion of the generator 30 to the vapor inlet port of the expanded-vapor-driven device 20. The pressurized and heated vapor in the conduit 36 drives the device 20 and the exhaust vapor from device 20 passes through the conduit 38 whereby it is returned to the upper chamber 39 of the absorber 12 where it is cooled and condensed by air passing transversely through the absorber, and finally remixed with the less volatile fluid of the fluid mixture by the time it reaches the bottom chamber 10 of the absorber 12.

The fluid in the bottom of the generator 30 is primarily made up of the less volatile fluid of the mixture, since the more volatile fluid has been vaporized out by heat, and thus the fluid in the bottom of generator 30 will be called the weak solution as opposed to the strong solution, which is the mixture of fluids in the bottom chamber 10 of the absorber 12. This weak solution in the bottom of the generator 30 is under pressure due to the pressurized vapor in the upper part of the generator 30. The pressurized weak solution is forced through a conduit 40 into the bottom inlet port of the heat exchanger 24, and from there the weak solution flows out of a conduit 42 and into the inlet port of a pressurized-liquid-driven device 44 to drive the latter.

The tubes 41 for the weak solution within the heat exchanger 24 are in suitably intertwined relationship with the tubes 43 carrying the strong solution down from the conduit 22 to the generator 30 so as to establish a heat exchanger relationship wherein the weak solution is cooled as it passes through the heat exchanger and the strong solution coming into the top of the generator is preheated.

The pressurized weak solution from the conduit 42 enters the inlet port of the pressurized-liquid-driven device 44, drives the device 44, and is discharged through the outlet port of the device 44 through a conduit 46 that extends to the middle chamber 48 of the absorber 12.

The absorber 12 has a plurality of tubes 50 which communicate with the upper chamber 39 thereof to receive the exhausted vapor from the device 20. The lower ends of the tubes 50 communicate with the middle chamber 48, which chamber receives the exhausted weak solution from the device 44. A similar plurality of tubes 52 extend from the middle chamber 48 of the absorber 12 to the bottom chamber 10. The outer surface of the tubes 50 and 52 serve as radiator surfaces for cooling the vapor and the liquid therein. A positive flow of air is maintained through the spaces between the tubes 50 and 52 at all times by means of a fan, which moves air through the generator 30 and through the burner 54, as will be described later. The exhausted vapor arriving in the upper chamber 39 of the absorber 12 disperses itself into the tubes 50 and is cooled, condensed, and drips down from the tubes 50 into the middle chamber 48 where it begins to mix with the weak solution delivered into the middle region 48 by the conduit 46. The mixed solution then passes down through the tubes 52, where it is additionally cooled and mixed, until it reaches the bottom chamber 10 of the absorber 12.

During the process of absorption, several things occur: (1) the latent heat of condensation of the vapor develops, raising the temperature of the solution; (2) the heat of dilution develops to help raise the temperature of the solution; (3) the vapor pressure of the vapor is reduced to that of the solution; and (4) the weak solution is converted to a strong solution. It will be clear then that a good deal of heat is released by the processes taking place in the absorber and that all of this heat is channelled into the air flow entering the burner, as will be described in detail below. This heat is not wasted as has been heretofore done in the art, but is rather returned to a useful function of preheating the combustion air so that less fuel is required to heat the fluid in the generator.

The burner 54 for the generator 30 is mounted upon a bulkhead 56 which is attached by means of a cylindrical sleeve 58 to the front of the generator 30. A frusto-conically shaped flame shield 60 having air holes 62 formed therein extends from the nozzle area of the burner 54 to the front of the generator 30. The openings 62 admit the secondary air for the burner flame by way of the openings 57 in the bulkhead 56. The primary air for the burner flame is admitted into the burner on the left side of the bulkhead 56. The air which passes through the absorber unit 12 is funnelled into the area immediately adjacent to the bulkhead 56 by means of duct walls 64 so that all of the preheated air passing through the absorber 12 is utilized as either the primary air or the secondary air for the burner 54. This primary and secondary air is drawn through the burner 54 and through the flue ducts 32 in the generator 30 by means of an electric suction fan 66 which is connected by means of duct walls 68 to the end of the generator 30 which is opposite the burner end thereof.

Within the duct wall 68 is a baffle 70 which is normally open when the burner is on, but which can be closed to block air from the right-hand end of the generator when the burner is off. The fan 66 may also be made to communicate with the opening 74 in the duct wall 64. This can be accomplished by manipulation of a second baffle 76 which is mounted within the duct wall 72. In normal operating conditions, the baffle 70 is normally open and the baffle 76 is normally closed. This applies the suction of the fan 66 to the right-hand side of the generator 30 and draws the air through the absorber 12, through the burner 54 as primary and secondary air for combustion, and through the flue ducts 32. When the burner is off, however, the baffle 70 may be closed and the baffle 76 opened. The fan 66 will then draw air from the absorber 12 through the opening 74 in order to shunt the air around the generator 30 when the burner 54 is turned off. The baffles 70 and 76 may be operated manually or they may be operated automatically by a suitable control circuit which is responsive to the state of the burner 54. The air outlet from fan 66 passes out of the system through an exhaust flue 67.

The burner 54 is automatically controlled to maintain a predetermined pressure range in the generator 30. The pressure within the generator 30 is sensed by a suitable pressure transducer 63 which is electrically connected to the burner control circuit by an electrical conductor 65. The burner control circuit causes ignition of the burner when the pressure in the generator 30 drops below a predetermined level, and shuts the burner off when the pressure rises above a predetermined level. Many thermostatic control circuits which perform these functions are known to those skilled in the art, and any suitable circuit can be used in connection with this invention. The electric power for the burner control circuit and for the electric fan 66 may be derived from a battery and generator unit 78 which is driven by expanded-vapor-driven device 20 through reducing gears in the box 18.

The primary power output is taken from the pressurized-liquid-driven device 44. A reducing gear box 80 is attached to the output of the device 44, and this in turn drives bevel gear sets 81 and 82, which drive a fly wheel 84 and an output shaft 83 which may be the power take-off shaft for a number of uses.

When it is desired to have a speed control for the output, as in an automobile, there may be an hydraulic pump 86 driving an hydraulic motor 88 to which it is coupled by hydrualic conduits 90 and 92. The speed of the hydraulic motor 88 can be controlled by controlling the speed of the hydraulic fluid flow through the conduits 90 and 92, and this is controllable in the hydraulic pump 86 by means of an adjustment arm 94. The pump 86 may be a variable speed piston pump with a wobble plate control such as is manufactured by New York Air Brake Company and such as is disclosed in U. S. Pat. No. 3,166,891. In the case of an automobile, as is indicated in FIG. 2, the hydraulic motor 88 is coupled to the automobile's drive mechanism at a suitable point to drive the automobile, and the automobile's accelerator 100 is coupled to the adjustment arm 94 to control the speed of the automobile.

Although the power plant of this invention is particularly well suited as a power plant for automobiles and other vehicles, it will be apparent that the invention can also be used as a power plant for aircraft, ships, boats, construction equipment, and the like, and also as a stationary power plant in applications that are too numerous to mention.

Although this invention has been described in connection with one illustrative embodiment thereof, it should be understood that the invention is not limited to the disclosed embodiment, since many modifications can be made in the disclosed structure without altering its basic principles of operation. Many such modifications will be apparent to those skilled in the art, and this invention includes all such modifications falling within the scope of the following claims.

We claim:

1. A power plant comprising a closed generator for a working fluid, means for heating the working fluid in said generator to vaporize the fluid and pressurize the vapor thereof, an expanded-vapor-driven device having a vapor inlet port and a vapor outlet port, a pressurized-liquid-driven device having a liquid inlet port and a liquid outlet port, vapor conduit means coupling the upper portion of said generator to the vapor inlet port of said expanded-vapor-driven device to drive the same, liquid conduit means coupling the lower portion of said generator to the liquid inlet port of said pressurized-liquid-driven device to drive the same, and means including an absorber coupling the outlet ports of both of said devices to said generator, said absorber being operable to condense the vapor exhausted from said expanded-vapor-driven device and combine it with the liquid from the pressurized-liquid-driven device to provide working fluid for return to said generator, said means for heating said working fluid comprising a fuel burner and said absorber being mounted in the path of the air input for said burner to preheat said air input while the latter serves as cooling air for the absorber.

2. A power plant having a working fluid mix which consists of a mixture of two fluid portions, a first one of said fluid portions being more volatile than a second one of said fluid portions and being soluble in said second fluid portion, a closed generator for said working fluid, means for heating the working fluid in said generator to vaporize the first fluid portion thereof and to pressurize the vapor thereof and place the second fluid portion under pressure, a fluid-driven device having a fluid inlet port and a fluid outlet port, conduit means coupling a portion of said generator which has the second fluid portion of the fluid inlet port of said device to drive the device, means including an absorber for coupling the fluid outlet port of said device to said generator, means for returning the first fluid portion from the generator to the absorber, said absorber being operable to condense said first fluid portion and including means for combining the two fluid portions to form a fluid mix for return to said generator, said means for heating said working fluid comprising a burner and said absorber being mounted in the path of the air input for said burner to preheat said air input while the latter serves as cooling air for the absorber.

3. A power plant as defined in claim 2 and further comprising a heat exchanger coupled between said generator and the inlet port of said fluid-driven device, said heat exchanger also being coupled between said absorber and said generator and being operable to cool the fluid entering said device and to heat the working fluid entering said generator.

4. A power plant as defined in claim 1 wherein the absorber is mounted in the path of both the primary and secondary air input for said burner.

5. A power plant as claimed in claim 2 in which the absorber is mounted in the path of both the primary and secondary air input for said burner.

* * * * *